US010926616B2

(12) United States Patent
Vasallo Fidalgo

(10) Patent No.: US 10,926,616 B2
(45) Date of Patent: Feb. 23, 2021

(54) POWER MODULE FOR MULTIMODAL TRANSPORTATION SYSTEM

(71) Applicant: Ford Global Technologies, LLC, Dearborn, MI (US)

(72) Inventor: Ricardo Vasallo Fidalgo, Paterna/Valcencia (ES)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 73 days.

(21) Appl. No.: 16/320,638

(22) PCT Filed: Jul. 28, 2016

(86) PCT No.: PCT/US2016/044416
§ 371 (c)(1),
(2) Date: Jan. 25, 2019

(87) PCT Pub. No.: WO2018/022056
PCT Pub. Date: Feb. 1, 2018

(65) Prior Publication Data
US 2019/0152308 A1    May 23, 2019

(51) Int. Cl.
*B62M 6/60*    (2010.01)
*B60K 1/04*    (2019.01)
(Continued)

(52) U.S. Cl.
CPC .................. *B60K 1/04* (2013.01); *B60K 1/00* (2013.01); *B62M 6/60* (2013.01); *B62M 6/75* (2013.01);
(Continued)

(58) Field of Classification Search
CPC .... B60K 1/04; B60K 1/00; B60K 2001/0416; B62M 6/60; B62M 6/75; B62M 6/90; B62M 13/04; B62J 50/20; B62J 43/13
See application file for complete search history.

(56) References Cited

U.S. PATENT DOCUMENTS 4,199,036 A    4/1980  Wereb
4,773,495 A    9/1988  Haubenwallner
(Continued)

FOREIGN PATENT DOCUMENTS

CN    203844939 U    9/2014
CN    104618865 A    5/2015
(Continued)

OTHER PUBLICATIONS

Extended European Search Report dated Feb. 20, 2020, Appl. No. 16910722.4.
(Continued)

*Primary Examiner* — Jacob B Meyer
(74) *Attorney, Agent, or Firm* — Brandon Hicks; Bejin Bieneman PLC

(57) ABSTRACT

A multimodal transportation system includes a module alternately coupleable with a vehicle and a mobility device. The module includes a casing and a motor, a battery, and a controller each supported by the casing. The vehicle and the module each include electrical contacts engageable with each other. The mobility device includes a frame, and the casing and the frame each include a locking element releasably engageable with each other.

20 Claims, 13 Drawing Sheets

(51) Int. Cl.
  *B62M 6/75*  (2010.01)
  *B62M 6/90*  (2010.01)
  *B60K 1/00*  (2006.01)
  *B62J 50/20*  (2020.01)

(52) U.S. Cl.
  CPC ....... *B62M 6/90* (2013.01); *B60K 2001/0416* (2013.01); *B62J 50/20* (2020.02)

(56) References Cited

U.S. PATENT DOCUMENTS

| | | | |
|---|---|---|---|
| 5,842,535 | A | 12/1998 | Dennis |
| 6,037,746 | A | 3/2000 | Sheng et al. |
| 6,150,794 | A * | 11/2000 | Yamada ............... B62M 6/45 320/108 |
| 6,588,787 | B2 | 7/2003 | Ou |
| 6,608,399 | B2 | 8/2003 | McConnell et al. |
| 7,568,714 | B2 | 8/2009 | Sasnowski et al. |
| 8,297,384 | B2 * | 10/2012 | Wanger ............... B62K 27/003 180/11 |
| 8,430,189 | B2 | 4/2013 | Tallino |
| 8,651,212 | B2 * | 2/2014 | Vincenz ............... B62H 5/001 180/205.1 |
| 8,827,128 | B2 * | 9/2014 | Degenstein ........... B60R 9/06 224/496 |
| 9,610,996 | B2 * | 4/2017 | Neugebauer .......... G08G 1/166 |
| 9,616,959 | B2 * | 4/2017 | Neugebauer .......... B60L 53/18 |
| 9,701,356 | B2 * | 7/2017 | Southey ............... B60L 50/20 |
| 9,902,452 | B2 * | 2/2018 | Gerhardt ............. G06F 13/4081 |
| 9,925,999 | B2 * | 3/2018 | Young ................ B62B 5/0036 |
| 9,963,185 | B2 * | 5/2018 | Neugebauer .......... G05D 3/10 |
| 9,975,498 | B2 * | 5/2018 | Lottes ................ B60R 11/02 |
| 10,005,317 | B2 * | 6/2018 | Biderman ............. B60L 3/12 |
| 10,259,311 | B2 * | 4/2019 | Biderman ............. G08G 1/202 |
| 10,308,065 | B2 * | 6/2019 | Biderman ............. B60L 3/12 |
| 10,525,998 | B2 * | 1/2020 | Young ................ B62B 5/0053 |
| 10,618,445 | B2 * | 4/2020 | Qiu .................. B60R 16/033 |
| 2004/0251068 | A1 | 12/2004 | Chen et al. |
| 2008/0272580 | A1 * | 11/2008 | Breed ................ B60R 21/206 280/735 |
| 2012/0086808 | A1 * | 4/2012 | Lynam ................ H04N 5/374 348/148 |
| 2015/0210350 | A1 * | 7/2015 | Biderman ............. B60K 7/0007 301/6.5 |
| 2015/0351979 | A1 | 12/2015 | Conte |
| 2016/0016625 | A1 * | 1/2016 | Williams ............. B62K 19/18 280/287 |
| 2016/0031506 | A1 * | 2/2016 | Lloyd ................ B60L 53/68 701/49 |
| 2016/0031507 | A1 * | 2/2016 | Neugebauer .......... B60L 15/20 180/206.1 |
| 2016/0031513 | A1 * | 2/2016 | Neugebauer .......... B60L 53/18 701/41 |
| 2016/0031514 | A1 * | 2/2016 | Gerhardt ............. B62H 5/20 710/304 |
| 2016/0031516 | A1 * | 2/2016 | Southey .............. B62J 27/00 280/278 |
| 2016/0031517 | A1 * | 2/2016 | Neugebauer .......... B62K 3/02 180/207.3 |
| 2016/0031524 | A1 * | 2/2016 | Gerhardt ............. B60L 53/18 701/22 |
| 2016/0031525 | A1 * | 2/2016 | Craven ............... B62M 6/40 180/206.2 |
| 2016/0075225 | A1 | 3/2016 | Aich et al. |
| 2016/0097650 | A1 * | 4/2016 | Aich ................. G01C 21/3415 701/22 |
| 2016/0167735 | A1 | 6/2016 | Olsommer |
| 2017/0116805 | A1 * | 4/2017 | Neupert .............. B60L 53/30 |
| 2017/0259879 | A1 * | 9/2017 | Southey .............. G06F 13/4081 |
| 2019/0152308 | A1 * | 5/2019 | Vasallo Fidalgo ..... B62M 6/90 |
| 2020/0220366 | A1 * | 7/2020 | Steiner .............. H02J 7/0045 |

FOREIGN PATENT DOCUMENTS

| | | |
|---|---|---|
| DE | 102010042018 A1 | 4/2012 |
| DE | 102014018111 A1 | 6/2015 |
| JP | 4514085 B2 | 7/2010 |
| WO | 199317904 A1 | 9/1993 |
| WO | 2006090213 A2 | 8/2006 |
| WO | 2006090213 A3 | 8/2006 |
| WO | 2015114614 A2 | 8/2015 |
| WO | 2015114614 A3 | 8/2015 |

OTHER PUBLICATIONS

Gingle, "Transportation—P loanes,, trains, automobiles and more, with a focus on safety, efficiency and low-carbon innovations", Corporate Knights, posted Dec. 22, 2011, http://www.corporateknights.com/channels/transportation/manfred-gingl-13245527/.

International Search Report and Written Opinion dated Jul. 28, 2016 re PCT/US2016/044416.

Coxworth, "Rubbee turns any bike electric", https://newatlas.com/rubbee-electric-bicycle-kit/28406/?tm_source=newatlas&itm_medium=article-body, Jul. 22, 2013.

* cited by examiner

POWER MODULE FOR MULTIMODAL TRANSPORTATION SYSTEM

BACKGROUND

A multimodal transportation system may include a vehicle used for one portion of a journey and a mobility device for another portion of the journey. For example, a user may transport the mobility device in the vehicle such that, after one portion of the journey is completed in the vehicle, the mobility device may be removed from the vehicle and used for another part of the journey. However, transport of the mobility device in the vehicle may cause packaging constraints within the vehicle, in particular with relatively small vehicles.

Also, in the event that the mobility device is motorized, the user may find it difficult to find a charging port to charge a battery of the mobility device. For example, in the event that the final destination is inside a building, e.g., a workplace office, the user may not be able to easily maneuver the mobility device into the building for charging.

DETAILED DESCRIPTION

Figure 1:
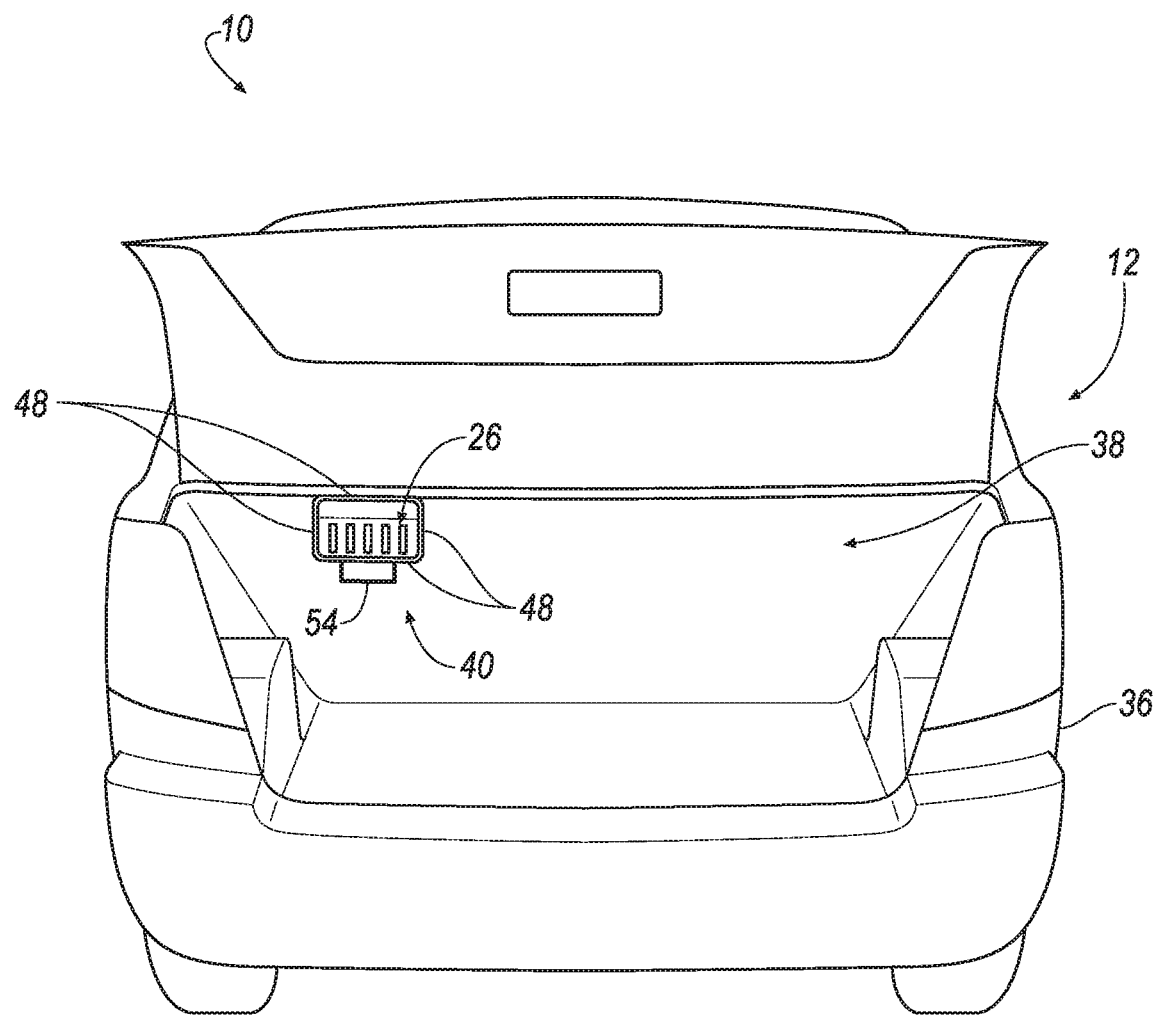
FIG. 1 is a front view of a charging bay disposed in a trunk of a vehicle.

With reference to the Figures, wherein like numerals indicate like parts throughout the several views, a multimodal transportation system 10 includes a vehicle 12, a mobility device 14, and a module 16. The module 16 includes a casing 18 and a motor 20, a battery 22, and a controller 24 each supported by the casing 18. The module 16 may be alternately coupleable with the vehicle 12 and the mobility device. The vehicle 12 and the module 16 may each include electrical contacts 26, 28 engageable with each other. The mobility device 14 may include a frame 30, and the casing 18 of the module 16 and the frame 30 of the mobility device 14 may each include a locking element 32, 34 releasably engageable with each other.

Figure 3:
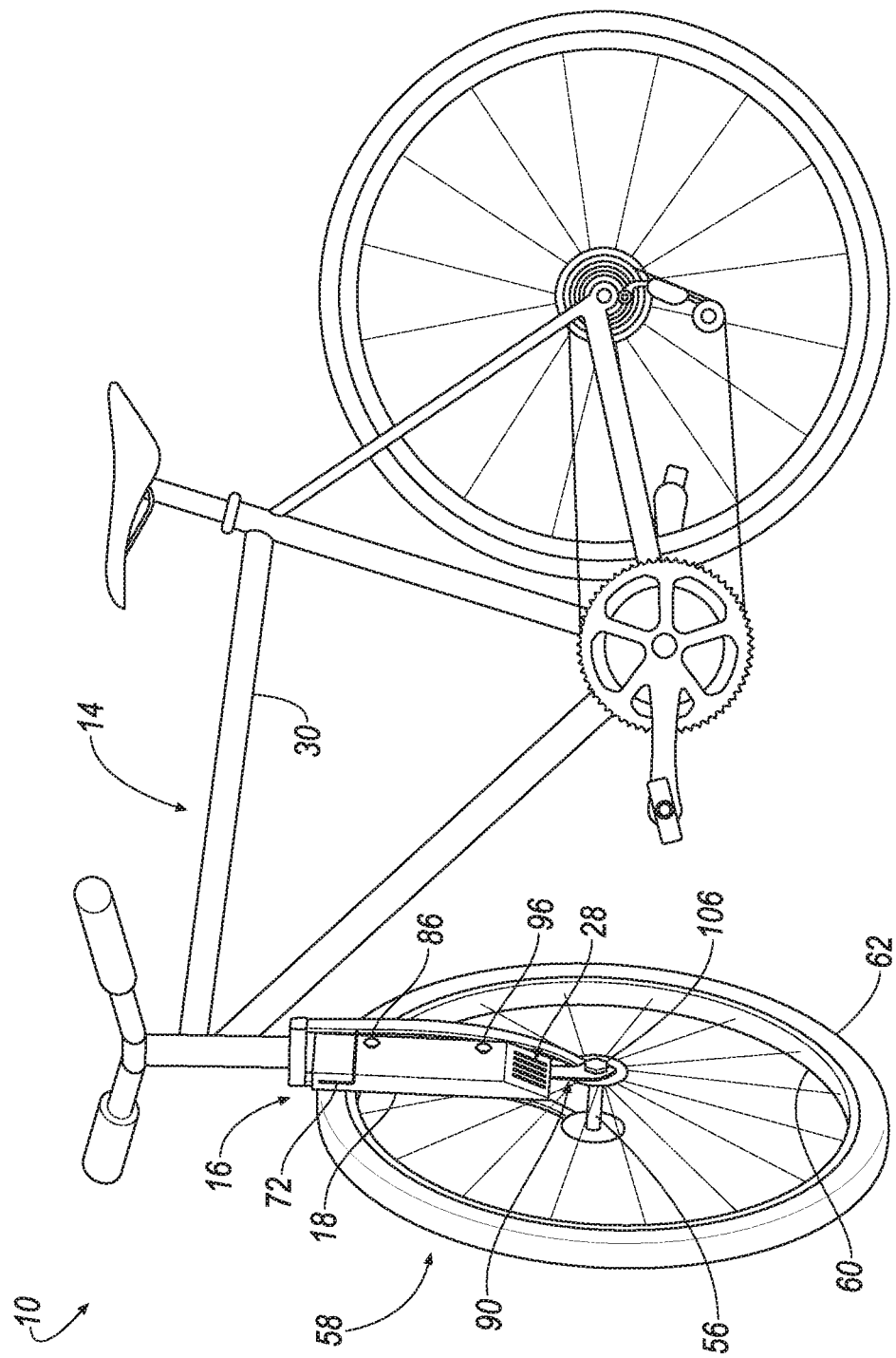
FIG. 3 is a perspective view of one embodiment of the module engaged with a mobility device.

The multimodal transportation system 10 allows for the sharing of the module 16 between the mobility device 14, the vehicle 12, and/or any other combinations of mobility devices 14 and vehicles 12. The module 16 may be stored in the vehicle 12 while a user travels in the vehicle 12 to a destination. When the destination is reached, the user may remove the module 16 from the vehicle 12 and attach the module 16 to the mobility device 14, as shown in FIG. 3. The user may use the module 16 to propel the mobility device 14. In this situation, the module 16 may reduce the input required by the user to propel the mobility device 14. The module 16 may be removed from the mobility device 14 and carried by the user for theft prevention and/or for electrically charging the module 16 at a destination, e.g., a final destination reached by walking, such as a workplace office.

Figure 6:
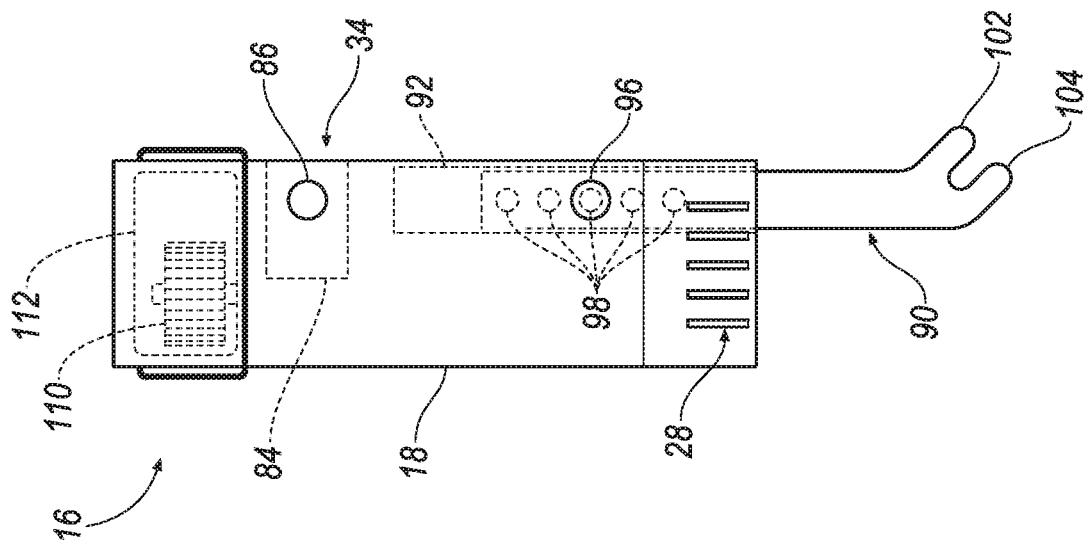
FIG. 6 is the side view of FIG. 5 with the fork in an extended position relative to the casing.
Figure 5:
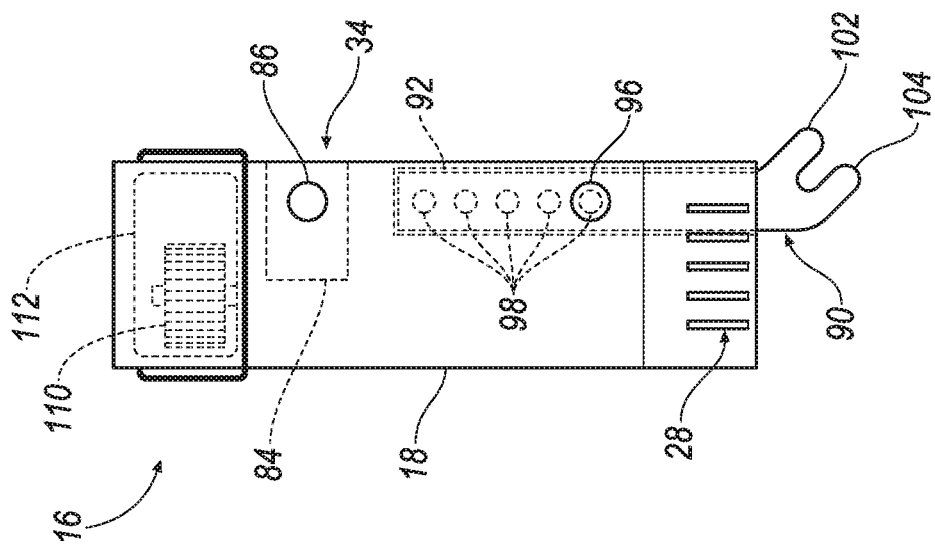
FIG. 5 is a side view of the module of FIG. 3 with a fork in a collapsed position relative to a casing of the module.

The module 16 may be stored in a charging position while in the vehicle 12. When the module 16 is in the charging position, the vehicle 12 may transfer electrical energy to the module 16, as set forth further below. The module 16 may store the electrical energy obtained from the vehicle 12. When a vehicle destination is reached, the module 16 may be disengaged from the charging position to a disengaged position, as shown in FIGS. 5 and 6, and removed from the vehicle 12. The module 16 may be engaged from the disengaged position, as shown in FIGS. 5 and 6, to an engaged position on the mobility device 14, as shown in FIG. 3. In the engaged position, the module 16 may be engaged with the mobility device 14. The module 16 may convert stored electrical energy into mechanical energy and transfer the mechanical energy to the mobility device 14, as set forth further below. In other words, the module 16 may provide power assist to drive the mobility device 14.

The vehicle 12 may be any suitable type of automobile. For example, the vehicle 12 may be a sedan, a light duty automobile, a hybrid automobile, or any other suitable type of automobile. In other words, the vehicle 12 may be in any suitable automobile classification. Alternatively, the vehicle 12 may be any suitable type of vehicle, e.g., a motorcycle, a scooter, or any other suitable type of vehicle.

As shown in FIG. 1, the vehicle 12 includes a vehicle body 36 defining a trunk 38 of the vehicle 12. With continued reference to FIG. 1, the trunk 38 of the vehicle 12 may include a charging bay 40 disposed in any suitable position within the trunk 38, as shown in FIG. 1. The charging bay 40 may be disposed in any suitable direction relative to the vehicle 12, e.g., in the vehicle fore-and-aft direction or the cross-vehicle direction.

Figure 2A:
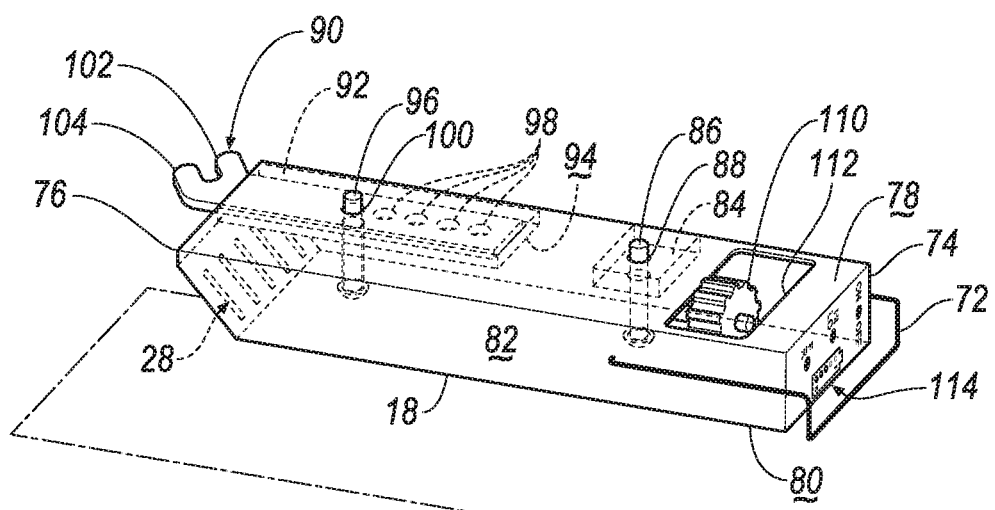
FIG. 2A is a perspective view of the charging bay and a module disengaged with the charging bay.
Figure 2A:
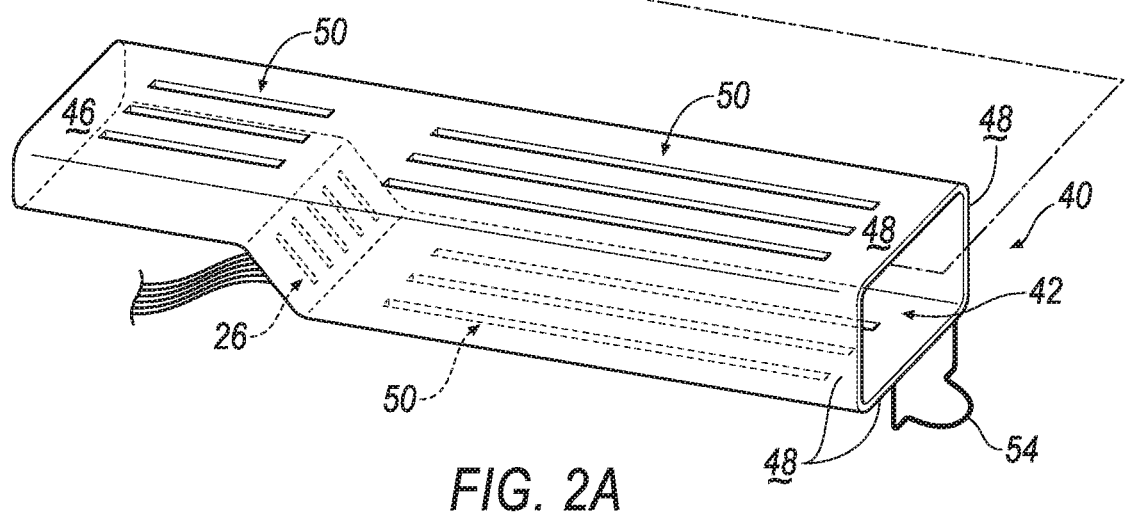
Figure 2B:
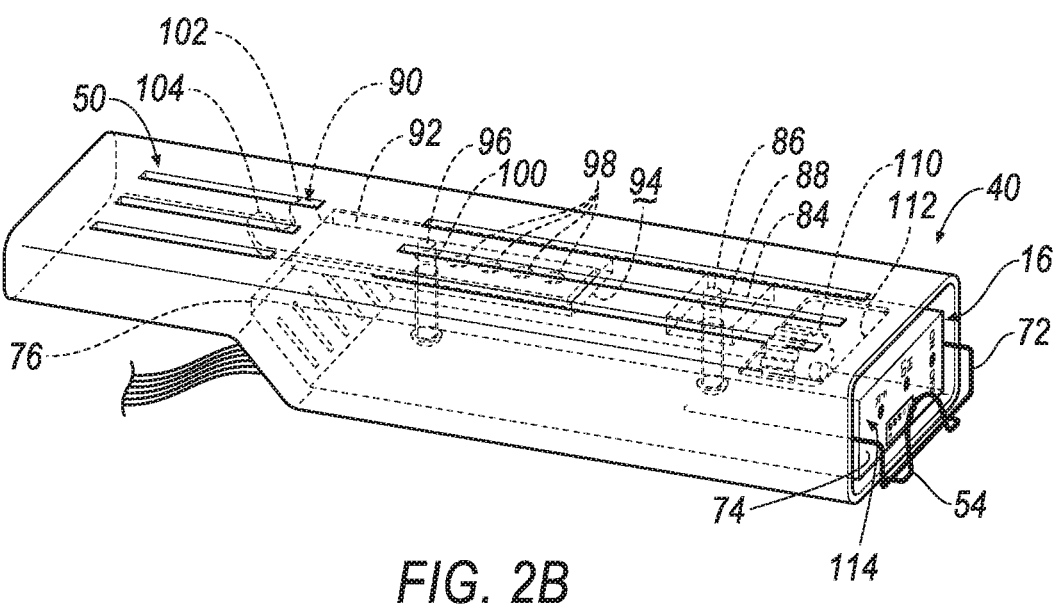
FIG. 2B is a perspective view of the module disposed in the charging bay.

As shown in FIGS. 2A and 2B, the charging bay 40 may be sized to slidably receive the module 16. In other words, the charging bay 40 may include a cavity 42 to accommodate the module 16 in the charging position. The cavity 42 may extend into the charging bay 40 from an open side 44 to a closed side 46 spaced from the open side 44. For example, the module 16 may slide through the open side 44 in the cavity 42 when the module 16 is transferred between the charging position and the disengaged position.

The charging bay 40 may include a plurality of support sides 48 extending from the open side 44 to the closed side 46. The support sides 48 may include a plurality of vents 50 extending through the support sides 48 to allow airflow to the module 16 in the charging position. The vents 50 may extend on the support sides 48 in any suitable direction. For example, the vents 50 may extend along the support sides 48 from the open side 44 to the closed side 46. Alternatively, the vents 50 may extend across the support sides 48 in any suitable direction, i.e., transverse to the direction from the open side 44 to the closed side 46. The vents 50 may extend any suitable length on the support side 48.

With continued reference to FIGS. 2A and 2B, the charging bay 40 may include the electrical contact 26 of the vehicle 12. The electrical contact 26 of the vehicle 12 may be disposed on the closed side 46 of the charging bay 40. The electrical contact 26 of the vehicle 12 may be in electrical communication with a battery 52 of the vehicle 12.

With continued reference to FIGS. 2A and 2B, the charging bay 40 may include a lock 54 releasably engageable with the module 16. In other words, the lock 54 may be engageable between a locked position and an unlocked position to interact with the module 16 in the charging bay 40. For example, the lock 54 may be disengaged from the locked position to the unlocked position to release the module 16 from the charging bay 40. As another example, the lock 54 may be engaged from the unlocked position to the locked position to retain the module 16 in the charging bay 40. The lock 54 may be disposed adjacent to the open side 44 on one of the support sides 48.

The mobility device 14 may be of any suitable type. For example, the mobility device 14 may be a bicycle, as shown in FIG. 3. Alternatively, the mobility device 14 may be a wheelchair, a tricycle, or any other suitable mobility device 14. The mobility device 14 may be accessed by a user in any suitable manner, e.g., the mobility device 14 may be transported in or on the vehicle 12, the mobility device 14 may be rented from a public rental system, etc. The module 16 may be alternately used on more than one mobility device 14 of the same or different type. As one example, the module 16 may be carried by a user and engaged with a mobility device 14 rented by the user from a public rental system, e.g. a bicycle rental system. As set forth below, the module 16 may be adjustable (e.g., with the fork 90 and adjustment slot 92) to accommodate for mobility devices 14 of different sizes and shapes.

The mobility device 14 may include an axle 56 fixed to the frame 30 and a wheel 58 rotatably supported by the axle 56. The wheel 58 may include a rim 60 and a tire 62 fixed to the rim 60. As set forth further below, and as shown in FIGS. 3-4B, the casing 18 of the module 16 may be selectively engaged with the frame 30 of the mobility device 14, which couples the motor 20 to the wheel 58 of the mobility device 14. When the motor 20 is coupled to the wheel 58 of the mobility device 14, the motor 20 may drive the wheel 58 of the mobility device 14 to propel the mobility device 14.

Figure 7:
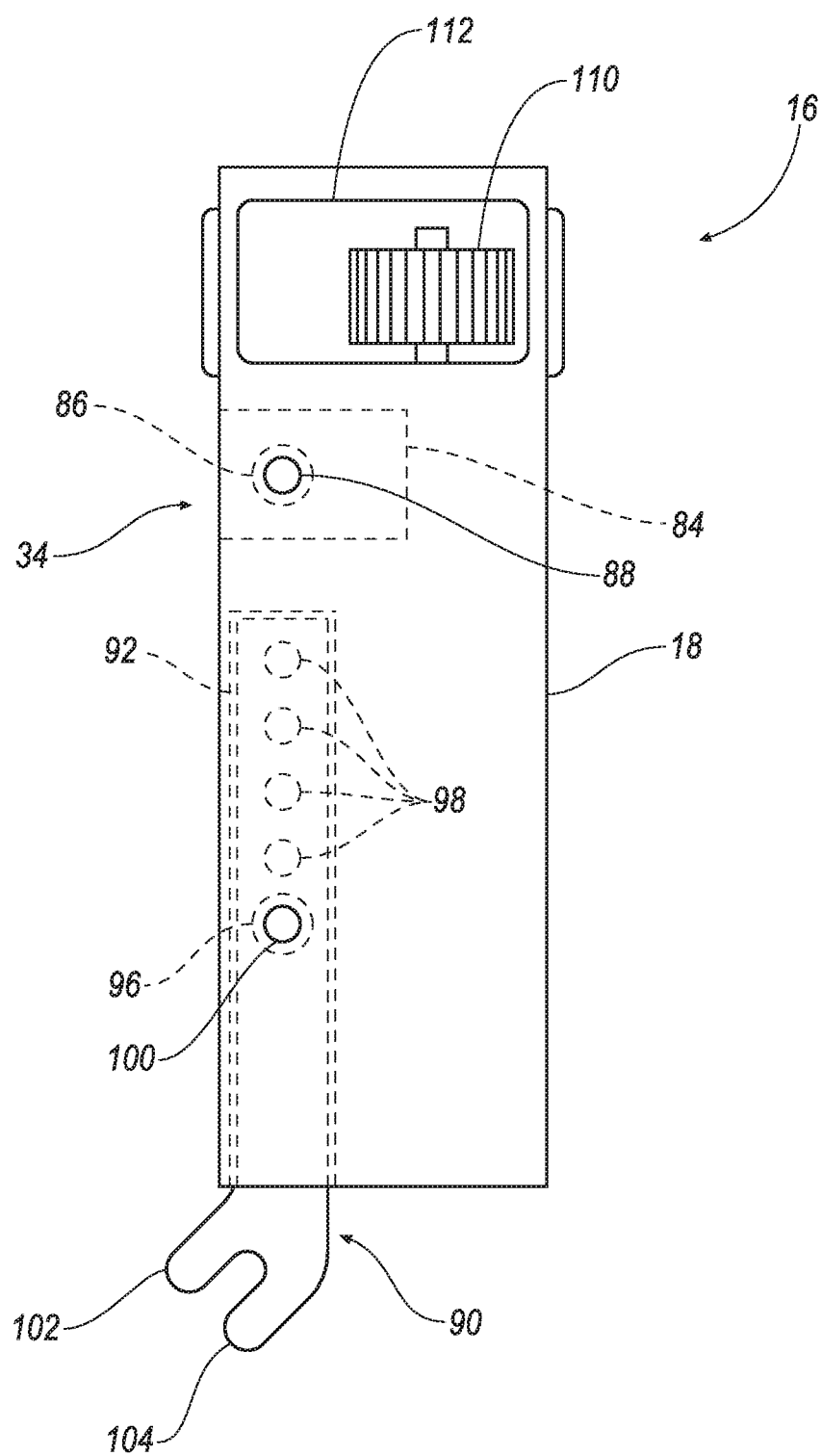
FIG. 7 is another side view of the module of FIG. 3.
Figure 8:
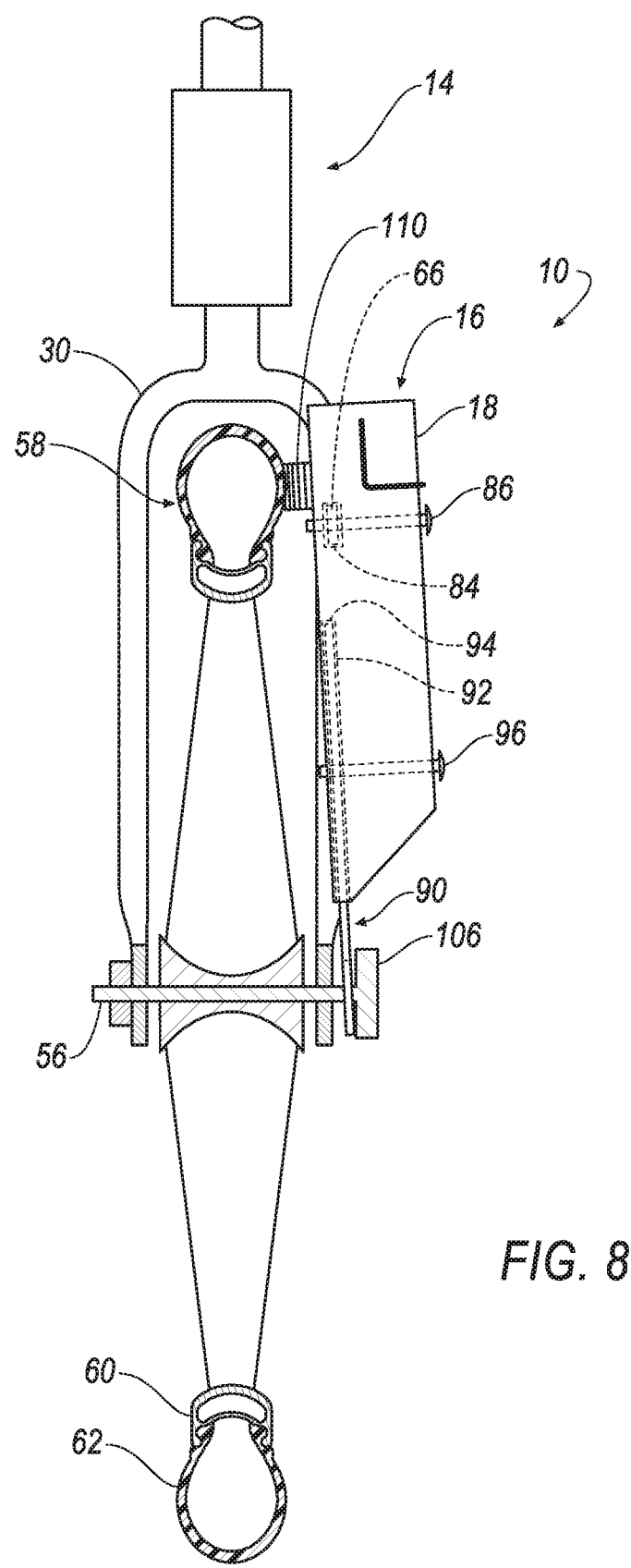
FIG. 8 is a front view of the module engaged with the mobility device of FIG. 3.
Figure 9:
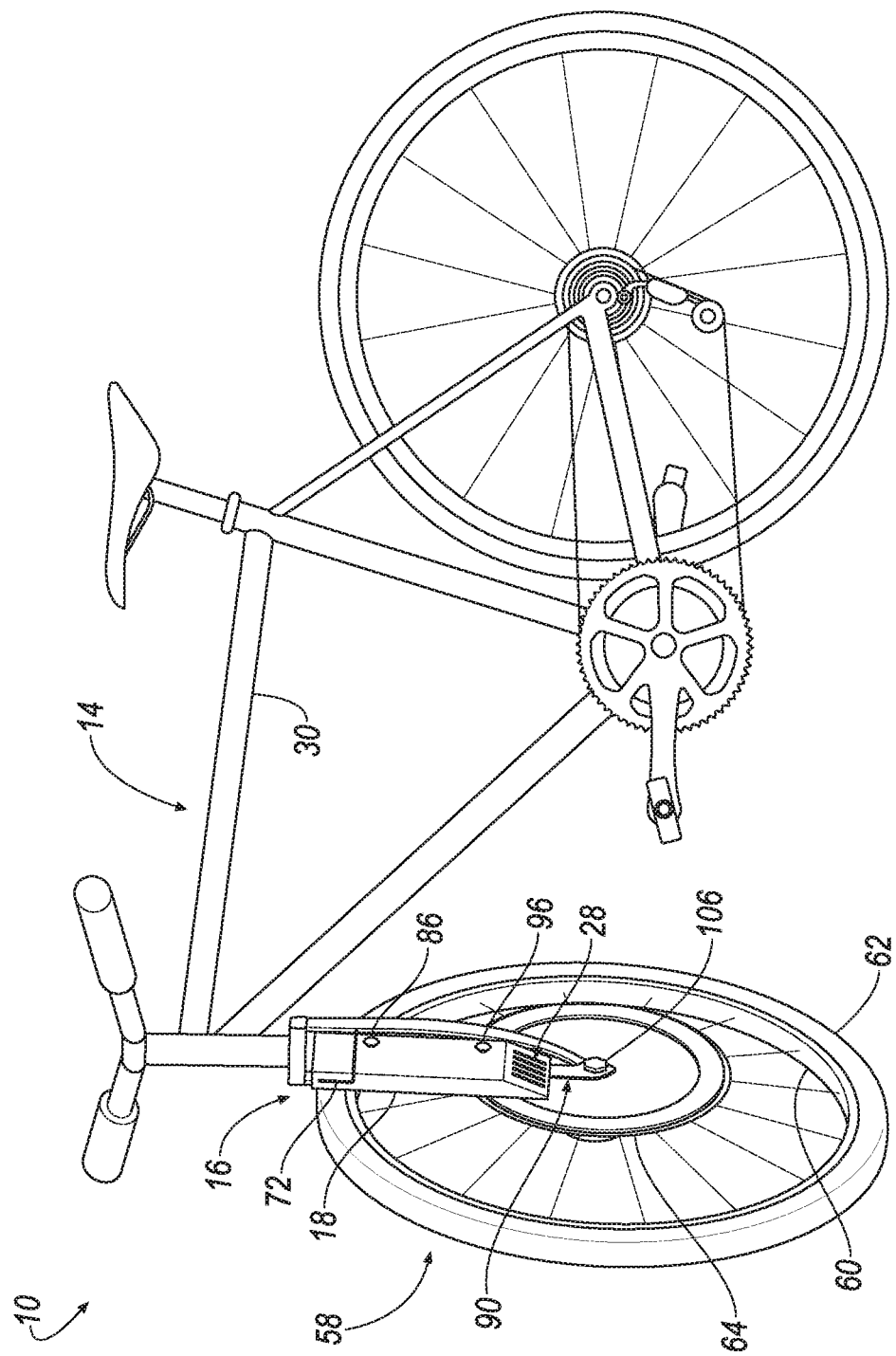
FIG. 9 is a perspective view of another embodiment of the module engaged with the mobility device.
Figure 10:
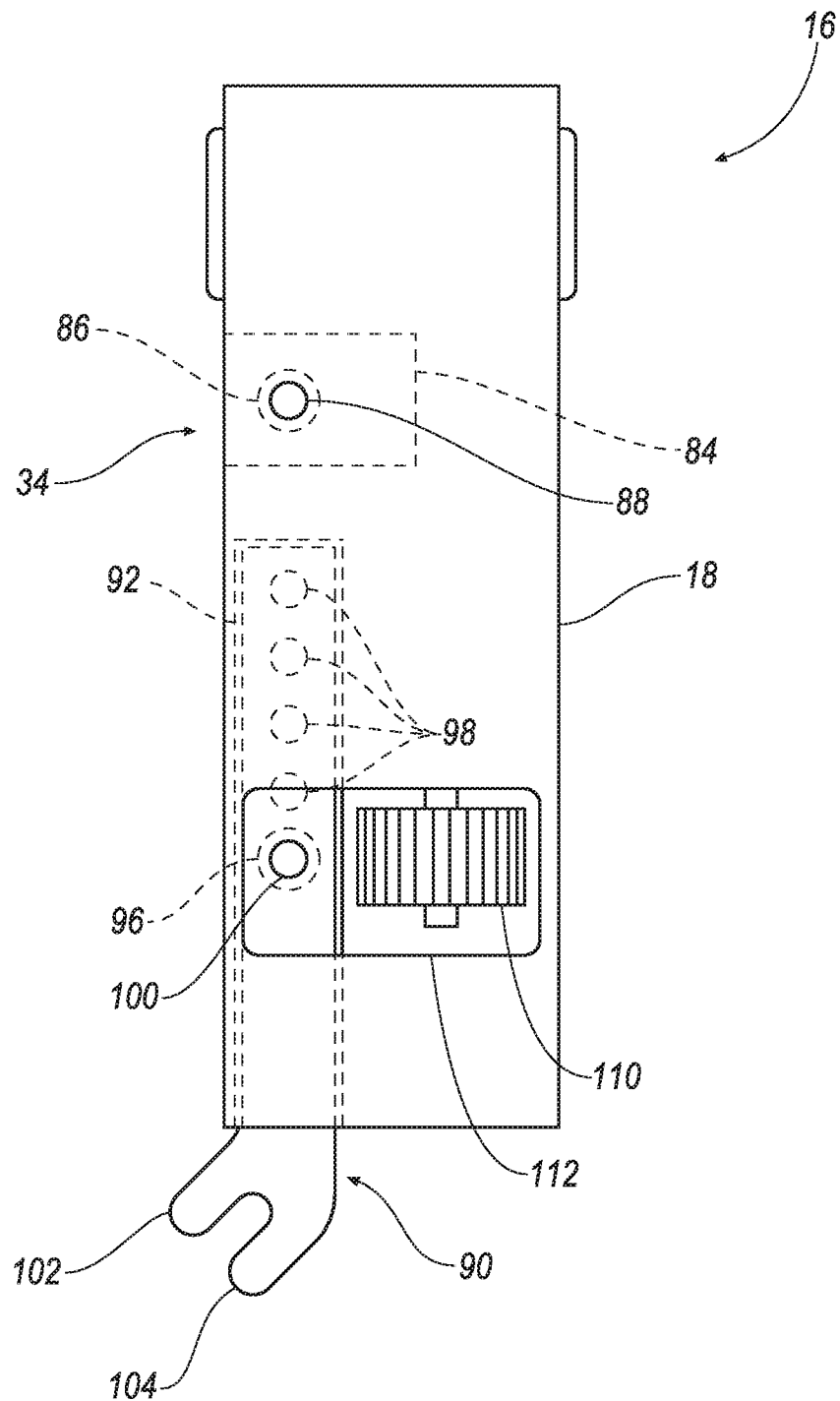
FIG. 10 is a side view of the module of FIG. 9.
Figure 11:
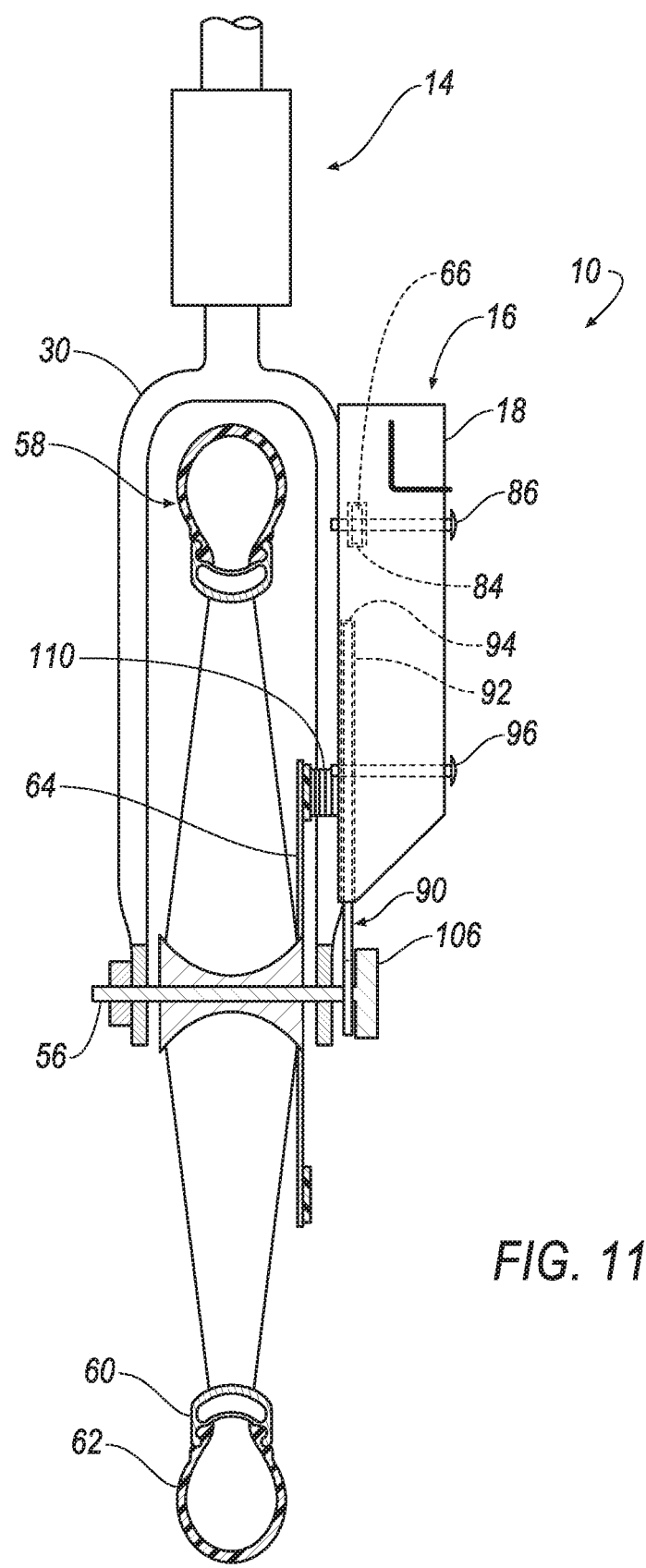
FIG. 11 is a front view of the module engaged with the mobility device of FIG. 9.

As set forth further below, one embodiment of the module 16 and mobility device 14 is shown in FIGS. 3-8 and another embodiment of the module 16 and mobility device 14 is shown in FIGS. 9-11. Specifically, in the embodiment shown in FIGS. 3-8, the motor 20 may be coupled to the tire 62 and/or rim 60 of the wheel 58 of the mobility device 14 to rotate the wheel 58 relative to the frame 30 of the mobility device 14. In the embodiment shown in FIGS. 9-11, the wheel 58 includes a sprocket 64 fixed to the rim 60. In this embodiment, the motor 20 may be coupled to the sprocket 64 to drive the wheel 58 relative to the frame 30 of the mobility device 14. Common numerals are used to identify common features in the two embodiments.

Figure 4A:
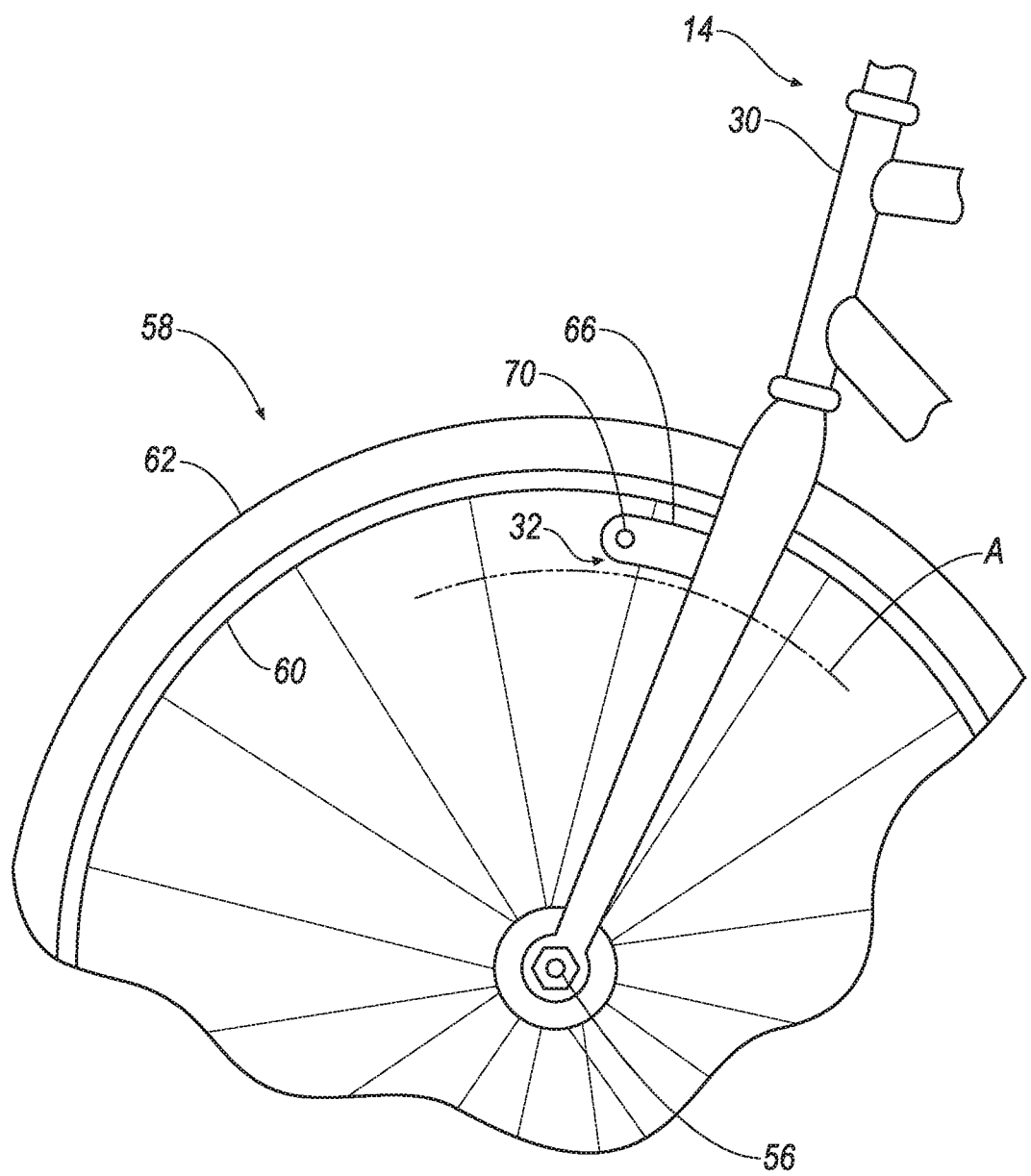
FIG. 4A is a side view of a portion of the mobility device of FIG. 3 without the module engaged with the mobility device.
Figure 4B:
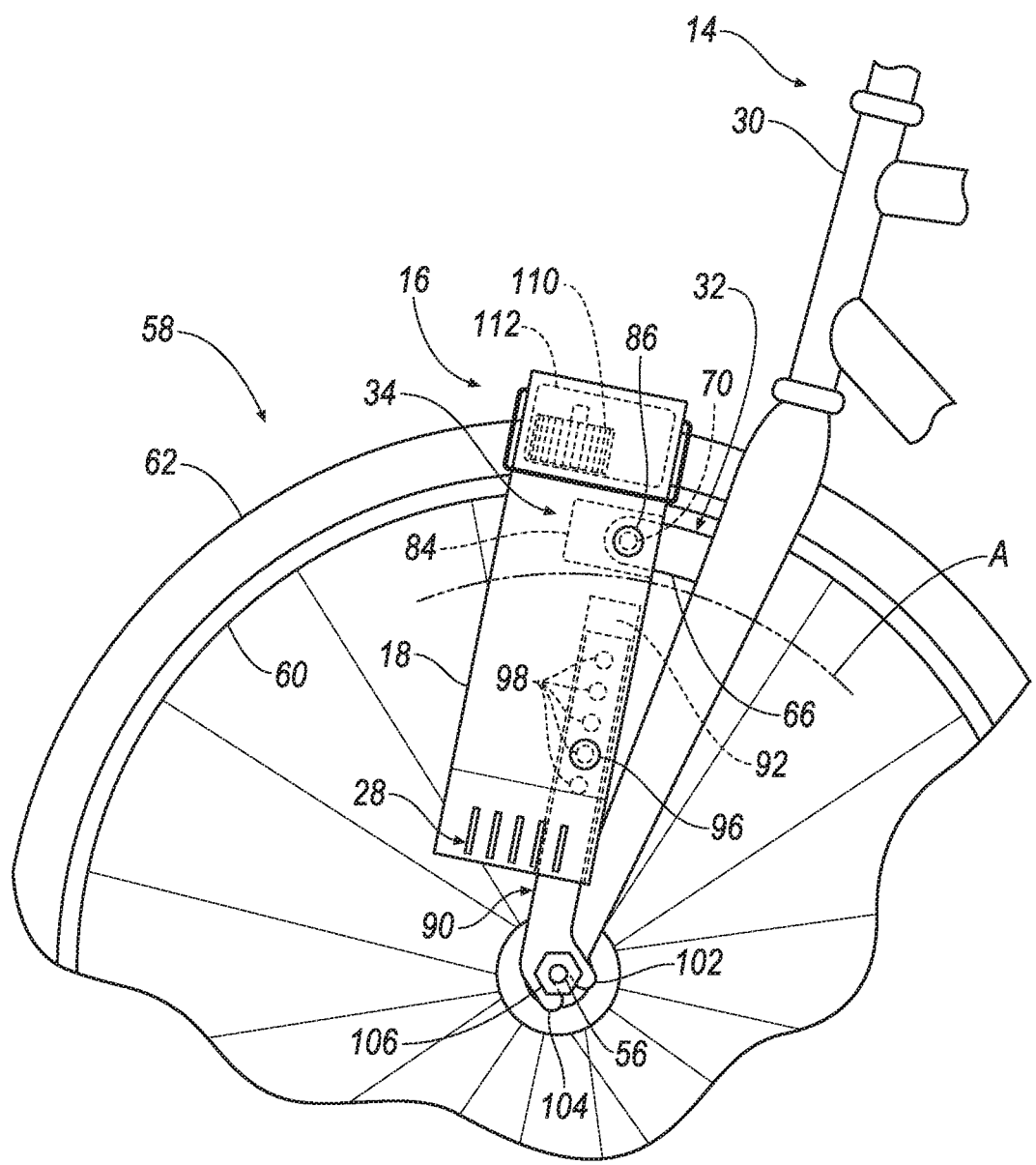
FIG. 4B is the side view of FIG. 4A with a locking element of the module engaged with a locking element of the mobility device.

As shown in FIG. 4A, the locking element 32 of the frame 30 of the mobility device 14 may include a finger 66. As set forth further below, the locking element 34 of the casing 18 may releasably engage the finger 66. In the alternative to the finger 66, the locking element may have any suitable configuration for releasably engaging the locking element 34 of the casing 18.

The finger 66 may be elongated along an arc A about the axle 56. As one example, the finger 66 may be curved circumferentially along the arc A about the axle 56. As another example, the finger 66 may extend linearly from the frame 30 tangentially to the arc A about the axle 56. The finger 66 may include a lock hole 70 extending through the finger 66 transverse to the arc A and spaced from the frame 30. The casing 18 may engage the lock hole 70, as set forth further below.

The finger 66 may be attached to the frame 30 in any suitable manner. For example, the finger 66 may be welded to the frame 30. Alternatively, the finger 66 may be removeably attached to the frame 30. For example, the finger 66 may be attached to the frame 30 by a bolt on bracket (not shown).

The module 16 may include a handle 72 to assist the user in transporting the module 16. When the user is transporting the module 16, the handle 72 may be rotatable from a stored position, as shown in FIG. 3, to a carrying position, as shown in FIGS. 2A and 2B.

The casing 18 may enclose the battery 22 and the controller 24. As set forth further below, the motor 20 may extend through the casing 18 for engaging the wheel 58 of the mobility device 14. With reference to FIGS. 5-7, the casing 18, for example, may include a top 74 and a bottom 76 spaced from the top 74. The bottom 76 of the casing 18 may be adjacent to the closed side 46 of the charging bay 40 when the module 16 is in the charging position. The casing 18 may include a proximal side 78, a distal side 80 spaced from the proximal side 78, and an intermediate side 82 extending from the proximal side 78 to the distal side 80. When the module 16 is engaged with the charging bay 40 in the charging position, the proximal side 78, the distal side 80 and the intermediate side 82 may each be adjacent to one of the support sides 48 of the charging bay 40. When the module 16 is engaged with the charging bay 40 in the engaged position, the proximal side 78 may be adjacent to the wheel 58.

As shown in FIGS. 5 and 6, the locking element 34 of the casing 18 may be a slot 84. The slot 84 may be designed to receive the finger 66. In other words, the slot 84 may be sized, shaped, and positioned to receive the finger 66 when the module 16 is moved toward the engaged position. The slot 84 may be disposed on the intermediate side 82 of the casing 18 and may extend into the casing 18 from the intermediate side 82 to a stop side of the casing 18.

With reference to FIGS. 4A-6, the slot 84 may include a finger lock 86 supported by the casing 18 and releasably engageable with the finger 66. In other words, the finger lock 86 may be engageable between a locked position, in which the finger lock 86 is disengaged with the finger 66, and an unlocked position, in which the finger lock 86 is engaged with the finger 66, e.g., engaging the lock hole 70. In the locked position, the finger lock 86 prevents the finger 66 from being removed from the slot 84. In the unlocked position, the finger lock 86 allows the finger 66 to be removed from the slot 84.

With continued reference to FIGS. 5 and 6, the casing 18 may include a first hole 88 extending through the casing 18, e.g., through the distal side 80, transverse to the slot 84. The finger lock 86 may be disposed in the first hole 88. The finger lock 86 may extend into the casing 18 any suitable amount when in the locked position. For example, the finger lock 86 may extend through the first hole 88 from the distal side 80 to the proximal side 78 of the casing 18. In other words, the finger lock 86 may extend through the casing 18 and the lock hole 70 of the finger 66. Alternatively, the finger lock 86 may extend from the distal side 80 of the casing 18 through lock hole 70 of the finger 66, i.e., partially through the casing 18.

The first hole 88 may extend through the casing 18 from the distal side 80 to the proximal side 78, or, alternatively, may extend to the slot 84 from the distal side 80 of the casing 18, i.e., partially through the casing 18. When the module 16 is in the engaged position, the first hole 88 may be aligned with the lock hole 70 of the finger 66.

With reference to FIGS. 4A-7, a fork 90 may be retractably extendable from the casing 18 and selectively engageably with the mobility device 14, e.g., the axle 56 of the mobility device 14. Specifically, the casing 18 may include an adjustment slot 92 spaced from the slot 84 and receiving the fork 90. The fork 90 may be retractable relative to the casing 18 in the adjustment slot 92. For example, the fork 90 may be retractable from an extended position to a retracted position to accommodate different sized wheels. In other words, the fork 90 may be retracted to the retracted position to align the module 16 with smaller wheels and extended to the extended position to align the module 16 with larger wheels.

The adjustment slot 92 may extend from the bottom 76 of the casing 18 to an internal side 94 of the casing 18. In other words, the adjustment slot 92 may extend partially through the casing 18. The internal side 94 may be disposed at any suitable position between the top 74 of the casing 18 and the bottom 76 of the casing 18.

With continued reference to FIGS. 4A-7, an adjustment lock 96 may be supported on the casing 18 between the casing 18 and the fork 90 for selectively locking the fork 90 to the casing 18 along the adjustment slot 92. The adjustment lock 96 may be moveable between a locked position, in which the adjustment lock 96 engages the fork 90 to lock the fork 90 relative to the casing 18, and an unlocked position in which the adjustment lock 96 disengages the fork 90 to unlock the fork 90 relative to the casing 18 to allow adjustment of the fork 90 along the adjustment slot 92.

As one example, the fork 90 may include a plurality of adjustment holes 98 spaced from each other along the fork 90, and the adjustment lock 96 may selectively engage one of the adjustment holes 98 to lock the fork 90 to the casing 18 along the adjustment slot 92. Alternatively, the adjustment lock 96 may engage the fork 90 in any suitable manner.

The casing 18 may include a second hole 100 and the adjustment lock 96 may be disposed in the second hole 100. The second hole 100 may extend through distal side of the casing 18 transverse to the adjustment slot 92. When the adjustment lock 96 is in the unlocked position, the adjustment holes 98 of the fork 90 may be alignable with the second hole 100 as the fork 90 is adjusted along the may be alignable with the adjustment holes 98 of the fork 90.

The second hole 100 may extend through the casing 18 from the distal side 80 to the proximal side 78. Alternatively, the second hole 100 may extend to the adjustment slot 92 from the distal side 80 of the casing 18, i.e. partially through the casing 18.

As shown in FIG. 4B, the fork 90 may be removeably engageable with the axle 56 of the mobility device 14. For example, the fork 90 may receive the axle 56 of the mobility device 14 in the engaged position. The fork 90 may include a first prong 102 and a second prong 104 spaced from the first prong 102. The second prong 104 may be spaced from the first prong 102 a sufficient amount to receive the axle 56. In other words, the axle 56 may be disposed between the first prong 102 and the second prong 104 in the engaged position.

With continued reference to FIGS. 4B and 8, the mobility device 14 may include a fastener 106, e.g., a nut, that engages the axle 56 to the frame 30 of the mobility device 14. The first prong 102 and the second prong 104 of the fork 90 may be selectively retained on the axle 56 between the frame 30 and the fastener 106.

Each lock, i.e., the lock 54, the finger lock 86, and the adjustment lock 96, may be engageable in a same or different manner. For example, each lock may be manually engageable, i.e., each lock may require the user to manually engage each lock in the unlocked position and the locked position. Alternatively, each lock may be electronically engageable, i.e., each lock may be electronically moved between the locked position and the unlocked position. As one example, each lock may be spring loaded to automatically engage in the locked position.

Each lock may be a same or different type of lock. Each lock may be any suitable type of lock. For example, each lock may be a spring loaded lever latch, as shown in FIGS. 2A and 2B, the fastener 106 may be a threaded nut, as shown in FIG. 4B, and the finger lock 86 and adjustment lock may each be a spring loaded plunger pin, as shown in FIGS. 5 and 6. Alternatively, each lock may be a clasp, a clamp, or any other suitable type of lock.

The electrical contact 28 of the module 16 may be supported by the casing 18. The casing 18 may define one or more openings through which the electrical contact extends and/or may be accessed. The electrical contact 28 of the module 16 may, for example, be disposed on the bottom 76 of the casing 18. The electrical contact may be positioned on the casing 18 to align with the electrical contact 26 of the vehicle 12 when the module 16 is in the charging position in the charging bay 40. In other words, the electrical contact 28 of the module 16 engages the electrical contact 26 of the vehicle 12, e.g., by direct contact, inductive transmission, etc., when the module 16 is in the charging position. In this situation, the electrical contacts may engage with each other to transfer electrical energy from the vehicle 12 to the module 16.

The electrical contacts of the vehicle 12 and the module 16, may be of a common type to engage each other to transfer electrical energy. The electrical contacts may take any suitable form. For example, each electrical contact could be a plurality of metal plates. Alternatively, each electrical contact may be a conductive strip with alternating conducting and non-conducting portions, electrical connectors, or other forms of connectors.

Figure 12:
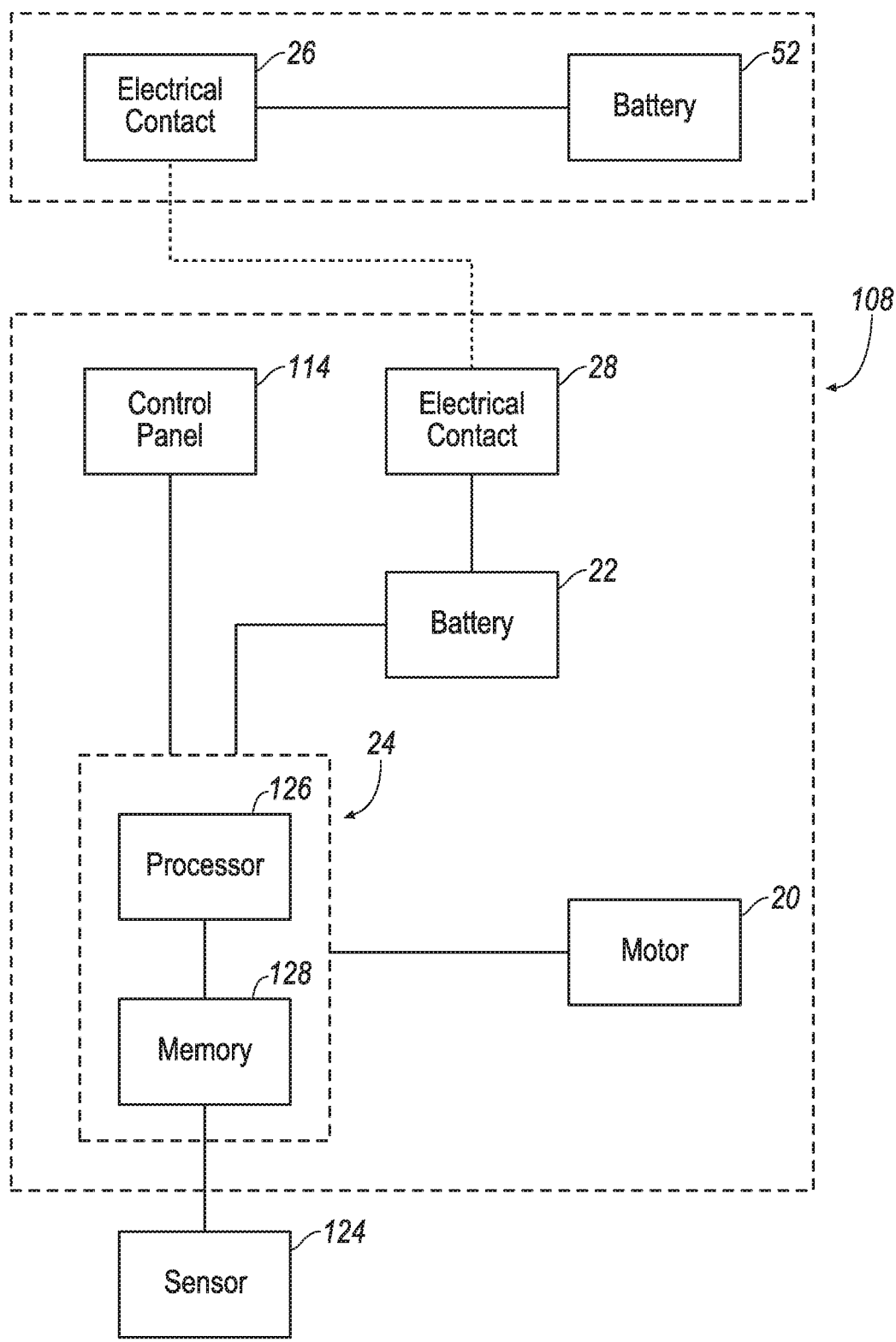
FIG. 12 is a schematic of a drive system of the mobility device connectable to the vehicle for charging.

The module 16 may include a drive system 108 housed within the casing 18. In particular, the drive system 108 may include the battery 22, the controller 24, and the motor 20, as shown in FIG. 12. The battery 22 and the controller 24 may be contained in the casing 18, i.e., enclosed by the casing 18.

The motor 20 may be an electric motor. The motor 20 may be any suitable type of electric motor. For example, the motor 20 may be a brushless DC motor. Alternatively, the motor 20 may be a brushed DC motor, a rotary magnetic motor, or any other suitable type of electric motor. The motor 20 may drive the wheel 58 of the mobility device 14 at a constant speed. In other words, the motor 20 may provide a uniform input to the wheel 58.

With reference to FIGS. 7 and 10, the motor 20 may include a roller 110 configured, i.e., positioned, shaped, and sized, to engage the wheel 58 to drive the wheel 58. For example, in the embodiment shown in FIGS. 3-8, the roller 110 may frictionally drive the wheel 58 through direct contact between the motor 20 and the tire 62. In the embodiment shown in FIGS. 9-11, the motor 20 may engage the sprocket 64 to drive the wheel 58 of the mobility device 14. In the embodiment shown in FIGS. 9-11, the roller 110 and the sprocket 64 may be toothed such that the roller 110 meshes with the sprocket 64 to drive the sprocket 64.

The motor 20, e.g., the roller 110, may extend through the casing 18. In particular, the motor 20 may extend through a motor slot 112 in the casing 18, as shown in FIGS. 7 and 10. The motor slot 112 may be positioned such that the roller 110 engages the tire 62, as shown in FIG. 7, i.e., slot may be adjacent to the top 74 of the casing 18 in one embodiment. Alternatively, the slot 84 may be positioned such that the roller 110 engages the sprocket 64, as shown in FIG. 10, i.e., the motor slot 112 may be adjacent to the bottom 76 of the casing 18 in another embodiment. Alternatively, the motor 20 may drive the wheel 58 in any suitable fashion.

The battery 22 may be a lithium battery. As shown in FIG. 12, the battery 22 may be in communication with the electrical contact 28 of the module 16. As set forth above, the electrical contact 28 of the module 16 receives electrical energy from the vehicle 12 when the module 16 is in the charging position. In this situation, the battery 22 may receive electrical energy from the electrical contact 28 of the module 16. The battery 22 may be charged by the electrical energy. In other words, the battery 22 may store the electrical energy transferred from the vehicle 12.

The battery 22 may be in direct or indirect communication with the motor 20 and controller 24. The battery 22 may transfer stored electrical energy to the motor 20 and the controller 24 to operate the drive system 108. In other words, the battery 22 may provide electrical power to the motor 20 and the controller 24.

As shown in FIG. 12, the controller 24 may be in communication with the motor 20. The controller 24 may be a microcontroller, or a computer, or a digital logic array, or any other form of electronic circuit which can receive input signals and commands, and provide output signals to control the motor 20. The controller 24 may include a processor 126 and a memory 128. The memory 128 includes one or more forms of computer-readable media, and stores instructions executable by the processor 126 for performing various operations, including those disclosed herein.

The controller 24 may employ any of a number of computer operating systems, including, but by no means limited to, versions and/or varieties of the Ford SYNC® application, AppLink/Smart Device Link middleware, the MICROSOFT® Automotive operating system, the Microsoft WINDOWS® operating system, the Unix operating system (e.g., the SOLARIS® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems.

Computer-executable instructions stored on the memory 128, as set forth above, may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (which may also be referred to as a processor-readable medium) includes any non-transitory (e.g., tangible) medium that participates in providing data (e.g., instructions) that may be read by the controller 24 (e.g., by the processor 126 of the controller 24). Such a medium may take many forms, including, but not limited to, non-volatile media and volatile media. Non-volatile media may include, for example, optical or magnetic disks and other persistent memory. Volatile media may include, for example, dynamic random access memory (DRAM), which constitutes a main memory. Such instructions may be transmitted by one or more transmission media, including coaxial cables, copper wire and fiber optics, including the wires that comprise a system bus coupled to the processor 126 of the computer 20. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is included within a computing device employing a computer operating system such as one of those mentioned above, and are accessed via a network in any one or more of a variety of manners. A file system may be accessible from a computer operating system, and may include files stored in various formats. An RDBMS employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The drive system 108 may include a control panel 114 having a plurality of switches 118, 120, 122 for controlling operation of the module 16, as set forth further below. The control panel 114 may be supported on the top 74 of the casing 18. The switches 118, 120, 122 may be any suitable type of switch. For example, the switches 118, 120, 122 may be push button switches, toggle switches, rotary switches, etc.

With continued reference to FIG. 12, the controller 24 may be in communication with the control panel 114. In other words, the controller 24 may be programmed to receive inputs from the control panel 114 for operation of the module 16. For example, the controller 24 could receive an input from the control panel 114 to drive the motor 20 at a particular speed, to drive the motor 20 in a particular direction, etc. The controller 24 may use a common communication protocol to receive commands from the control panel 114. The common communication protocol could be of any suitable type, e.g., a standard protocol, a custom protocol, or any other suitable protocol.

Figure 13:
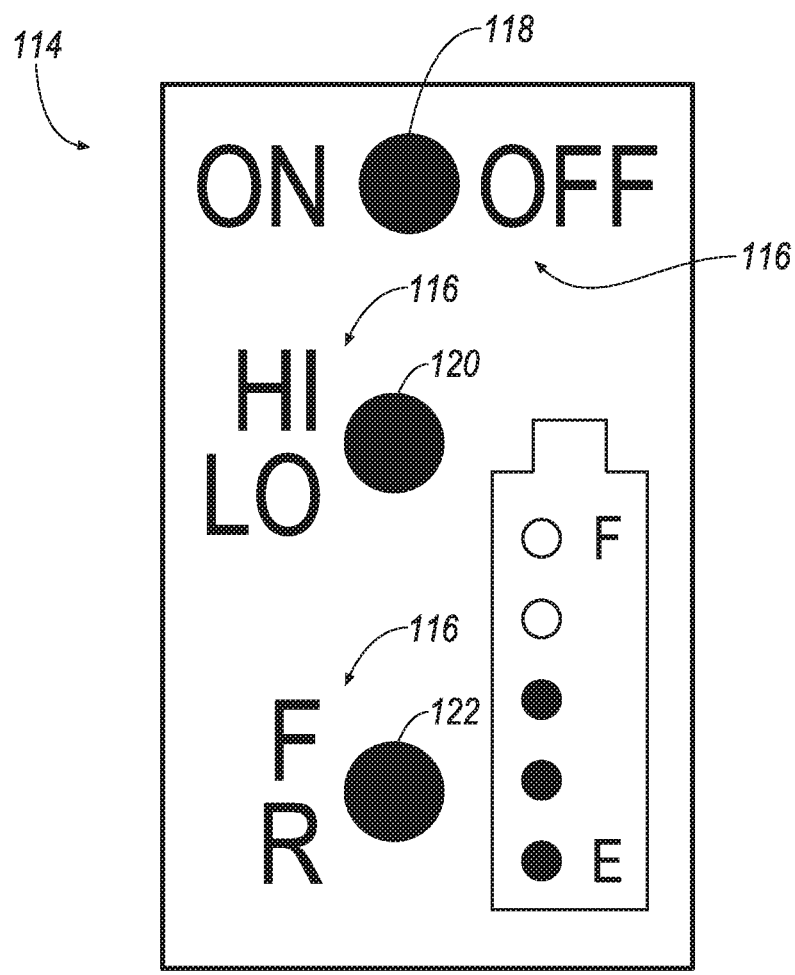
FIG. 13 is a top view of the module including a control panel

As shown in FIG. 13, one of the switches may be a power switch 118 to activate and deactivate the module 16. For example, the power switch 118 may include an ON position and an OFF position. When the power switch 118 is in the ON position, e.g., a depressed push button switch, the module 16 may turn on. When the power switch 118 is in the OFF position, e.g., a raised push button switch, the module 16 may turn off.

With continued reference to FIG. 13, one of the switches may be a speed switch 120 to select a speed setting for the motor 20. For example, the speed switch 120 may include a LO position and a HI position. When in the speed switch 120 is in the LO position, e.g., a raised push button switch, the motor 20 may rotate at one speed. When the speed switch 120 is in the HI position, e.g., a depressed push button switch, the motor 20 may rotate at another speed, i.e., the motor 20 may rotate at an increased speed.

With continued reference to FIG. 13, one of the switches may be a direction switch 122 to select a driving direction for the motor 20. For example, the direction switch 122 may include a forward position and a reverse position. When the direction switch 122 is in the forward position, e.g., a raised push button switch, the motor 20 may rotate in a direction, e.g., counterclockwise, to propel the mobility device 14 forward. When the direction switch 122 is in the reverse position, e.g., a depressed push button switch, the motor 20 may rotate in another direction, e.g., clockwise, to propel the mobility device 14 backward.

The drive system 108 may include a sensor 124 to detect acceleration and deceleration of the mobility device 14. As shown in FIG. 12, the sensor 124 may be in communication with the controller 24. The sensor 124 may be any suitable type of sensor to sense acceleration and deceleration, e.g., a gyroscopic sensor, a GPS-based sensor, an accelerometer, etc.

The sensor 124 detects acceleration and deceleration of the wheel and generates a signal to the controller 24 indicating acceleration/deceleration. When the power switch 118 is ON, and the sensor 124 senses acceleration and generates a signal to the controller, the controller 24 may power the motor 20 to propel the mobility device 14. As one example, the acceleration may be caused by manual input from the user, e.g., pedaling. As set forth above, when the motor may rotate at a constant speed, i.e., the motor 20 may provide uniform assistance in propelling the mobility device 14. In other words, when the power switch 118 is ON, the motor 20 begins to propel the mobility device 14 when the user manually accelerates the mobility device 14, e.g., by pedaling.

While the motor 20 propels the mobility device 14, when the sensor 124 senses deceleration and generates a signal to the controller 24, the controller 24 may stop power to the motor 20. As one example, the deceleration may be caused by manual input from the user, e.g., braking the mobility device 14. In other words, as the motor 20 propels the mobility device 14, when the user manually decelerates the mobility device 14, e.g., by braking, the motor 20 ceases propelling the mobility device 14. During additional deceleration, the wheel 58 may continue to rotate the roller 110 and the motor 20 may charge the battery 22 with regenerative energy.

During one part of the journey, the module 16 may be stored in the charging bay 40 of the vehicle 12. When the module 16 is stored in the charging bay 40, the lock 54 may be engaged in the locked position to secure the module 16 in the charging bay 40. The electrical contact 28 of the module 16 may engage the electrical contact 26 of the vehicle 12 to transfer electrical energy from the vehicle 12 to the module 16. The electrical energy may be transferred to the battery 22 to charge the battery 22 of the module 16.

When the destination is reached, the user may disengage the lock 54 to the unlocked position and slide the module 16 out of the charging bay 40. The user may adjust the position of the fork 90 by disengaging the adjustment lock 96 and sliding the fork 90 relative to the casing 18. The fork 90 may be secured to the casing 18 by aligning the second hole 100 of the casing 18 with one of the adjustment holes 98 on the fork 90 and engaging the adjustment lock 96 in the locked position. The user may engage the fork 90 to the axle 56 of the mobility device 14. In this situation, the user may pivot the module 16 about the axle 56 towards the finger 66. As the module 16 pivots, the finger 66 may slide into the slot 84 in the engaged position. When the module 16 is in the engaged position, the first hole 88 on the casing 18 and the lock hole 70 on the finger 66 may be aligned. In this situation, the user may engage the finger lock 86 to the locked position to lock the finger 66 in the slot 84. The user may engage the fastener 106 to the locked position to secure the fork 90 to the axle 56. In the engaged position, the motor 20 may engage the wheel 58 of the mobility device 14 to drive the mobility device 14, e.g., to engage the tire 62 in the embodiment of FIGS. 3-8 or to engage the sprocket 64 in the embodiment of FIGS. 9-11. In this situation, the user may activate the module 16 and continue the journey on the mobility device 14.

When the sensor 124 detects acceleration, the controller 24 may activate the motor 20 with power from the battery 22 to drive the wheel 58. The motor 20 may provide a uniform power assist to the mobility device 14 during operation. When the sensor 124 detects deceleration, the controller 24 may deactivate the motor 20 disabling power assist. During deceleration, the wheel 58 of the mobility device 14 may continue to rotate and may drive the motor 20. In this situation, the module 16 may convert the mechanical energy from the mobility device 14 into electrical energy to charge the battery 22. When the second destination is reached, the module 16 may be removed from the mobility device 14 by disengaging the fastener 106 to release the axle 56 and the finger lock 86 to release the finger 66.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. A multimodal transportation system comprising:
a vehicle;
a mobility device including a frame and an axle attached to the frame, the mobility device including a wheel rotatably supported by the axle; and
a module including a casing and a motor, a battery, and a controller supported by the casing;

the module configured to alternately couple with the vehicle and the axle of the mobility device, the vehicle and the module each including electrical contacts engageable with each other, and the casing and the frame each including a locking element releasably engageable with each other.

2. The multimodal transportation system according to claim 1, wherein the vehicle includes a charging bay sized to slideably receive the module, the charging bay including the electrical contact of the vehicle.

3. The multimodal transportation system according to claim 2, wherein the charging bay includes a lock releasably engageable with the module.

4. The multimodal transportation system according to claim 1, wherein the locking elements include a finger on one of the frame and the casing and a slot designed to receive the finger on the other of the frame and the casing.

5. The multimodal transportation system according to claim 4, further comprising a finger lock supported by the casing and releasably engageable with the finger.

6. The multimodal transportation system according to claim 4, wherein the finger is elongated along an arc about the axle.

7. The multimodal transportation system according to claim 1, wherein the module includes a fork removeably engageable with the axle.

8. The multimodal transportation system according to claim 7, wherein the fork includes a fastener releasably engageable with the axle.

9. The multimodal transportation system according to claim 8, wherein the fork is retractable relative to the casing.

10. The multimodal transportation system according to claim 1, wherein the motor is removeably coupleable to the wheel of the mobility device.

11. The multimodal transportation system according to claim 1, further comprising a sprocket rotatably supported by the axle and removeably coupleable to the motor.

12. The multimodal transportation system according to claim 1, wherein the controller and the battery are each contained in the casing and the motor extends through the casing.

13. A mobility device comprising:
a frame;
a wheel;
an axle attached to the frame and rotatably supporting the wheel; and
a module including a casing and a fork removeably engaged with the axle, the module including a motor, a battery, and a controller each supported by the casing;
a finger on one of the casing and the frame and a slot on the other of the casing and the frame removeably receiving the finger.

14. The mobility device according to claim 13, wherein the slot includes a finger lock releasably engaged with the finger.

15. The mobility device according to claim 13, wherein the finger is elongated along an arc about the axle.

16. The mobility device according to claim 13, wherein the fork includes a fastener releasably engaged with the axle of the mobility device.

17. The mobility device according to claim 13, wherein the fork is retractable relative to the casing.

18. The mobility device according to claim 13, wherein the motor is removeably coupled to the wheel of the mobility device.

19. The mobility device according to claim 13, further comprising a sprocket rotatably supported by the axle and removeably coupled to the motor.

20. The mobility device according to claim 13, wherein the controller and the battery are each contained in the casing and the motor extends through the casing.

* * * * *